(12) United States Patent
Kuroda

(10) Patent No.: US 10,873,672 B2
(45) Date of Patent: Dec. 22, 2020

(54) IMAGE PROCESSING APPARATUS, METHOD OF CONTROLLING IMAGE PROCESSING APPARATUS, AND STORAGE MEDIUM

(71) Applicant: CANON KABUSHIKI KAISHA, Tokyo (JP)

(72) Inventor: Takashi Kuroda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/101,782

(22) Filed: Aug. 13, 2018

(65) Prior Publication Data
US 2019/0068796 A1 Feb. 28, 2019

(30) Foreign Application Priority Data
Aug. 23, 2017 (JP) .................................. 2017-159942

(51) Int. Cl.
| H04N 1/00 | (2006.01) |
| G06T 7/90 | (2017.01) |
| H04N 1/56 | (2006.01) |
| H04N 1/46 | (2006.01) |

(52) U.S. Cl.
CPC .......... *H04N 1/00005* (2013.01); *G06T 7/90* (2017.01); *H04N 1/00031* (2013.01); *H04N 1/00801* (2013.01); *H04N 1/46* (2013.01); *H04N 1/56* (2013.01); *G06T 2207/10008* (2013.01); *G06T 2207/30176* (2013.01); *H04N 2201/33378* (2013.01)

(58) Field of Classification Search
CPC .......... H04N 1/00005; H04N 1/00031; H04N 1/00801; H04N 1/46; H04N 1/56; H04N 2201/33378; G06T 7/90; G06T 2207/30176; G06T 2207/10008
USPC ................. 358/462, 1.15, 1.9, 453, 448, 2.1
See application file for complete search history.

(56) References Cited

U.S. PATENT DOCUMENTS

| 2004/0130736 | A1* | 7/2004 | Lee ...................... H04N 1/6011 358/1.9 |
| 2010/0195128 | A1* | 8/2010 | Tanaka ............... G03G 15/0121 358/1.9 |
| 2015/0181081 | A1* | 6/2015 | Hakamada ............... H04N 1/46 358/2.1 |
| 2015/0206115 | A1* | 7/2015 | Matsunaga .......... G06Q 20/145 358/2.1 |

FOREIGN PATENT DOCUMENTS

JP    2003-330241 A    11/2003

* cited by examiner

*Primary Examiner* — Quang N Vo
(74) *Attorney, Agent, or Firm* — Canon U.S.A., Inc. IP Division

(57) ABSTRACT

A method of controlling an image processing apparatus makes it possible to suppress, in an auto color selection function, color determination resulting from a minute color element of a document without troubling a user.

8 Claims, 9 Drawing Sheets

IMAGE PROCESSING APPARATUS, METHOD OF CONTROLLING IMAGE PROCESSING APPARATUS, AND STORAGE MEDIUM

BACKGROUND

Field

The present disclosure relates to an image processing apparatus that automatically determines a color of a document and performs processing, a method of controlling the image processing apparatus, and a storage medium.

Description of the Related Art

An existing image forming apparatus performs color print output in a case where a document is determined as a color document in auto color selection (hereinafter, "ACS") and performs monochrome print output in a case where the document is determined as a monochrome document.

In recent years, color determination accuracy of the ACS has improved with higher performance of image processing. Therefore, a minute color element of the document is detected. However, as an adverse effect thereof, there is an issue that the document can be determined as a color document due to dirt or yellowing of the document, and the document is printed in color.

Japanese Patent Application Laid-Open No. 2003-330241 discusses a technique in which document image data and a result of ACS determination are temporarily stored in a storage device, and the result of ACS determination is forcibly changed before printing or transmission output.

The above-described existing technique includes, with respect to the document image data and the result of ACS determination held by the storage device, confirming an image of each page and changing the result of ACS determination.

SUMMARY

According to an aspect of the present disclosure, an image processing apparatus includes a reading unit configured to read image data from a document, a determination unit configured to perform color determination, based on the image data, to determine whether the document is a color document or a monochrome document, a processing unit configured to process the image data based on a result of the color determination, and a setting unit configured to set a mode relating to the color determination. The determination unit performs the color determination using a first reference value in a case where a first mode is set by the setting unit, and performs the color determination using a second reference value different from the first reference value in a case where a second mode is set by the setting unit.

Further features will become apparent from the following description of exemplary embodiments with reference to the attached drawings.

DESCRIPTION OF THE EMBODIMENTS

Exemplary embodiments of the present disclosure will be described below with reference to drawings.

<Description of Image Processing Apparatus>

Figure 1:
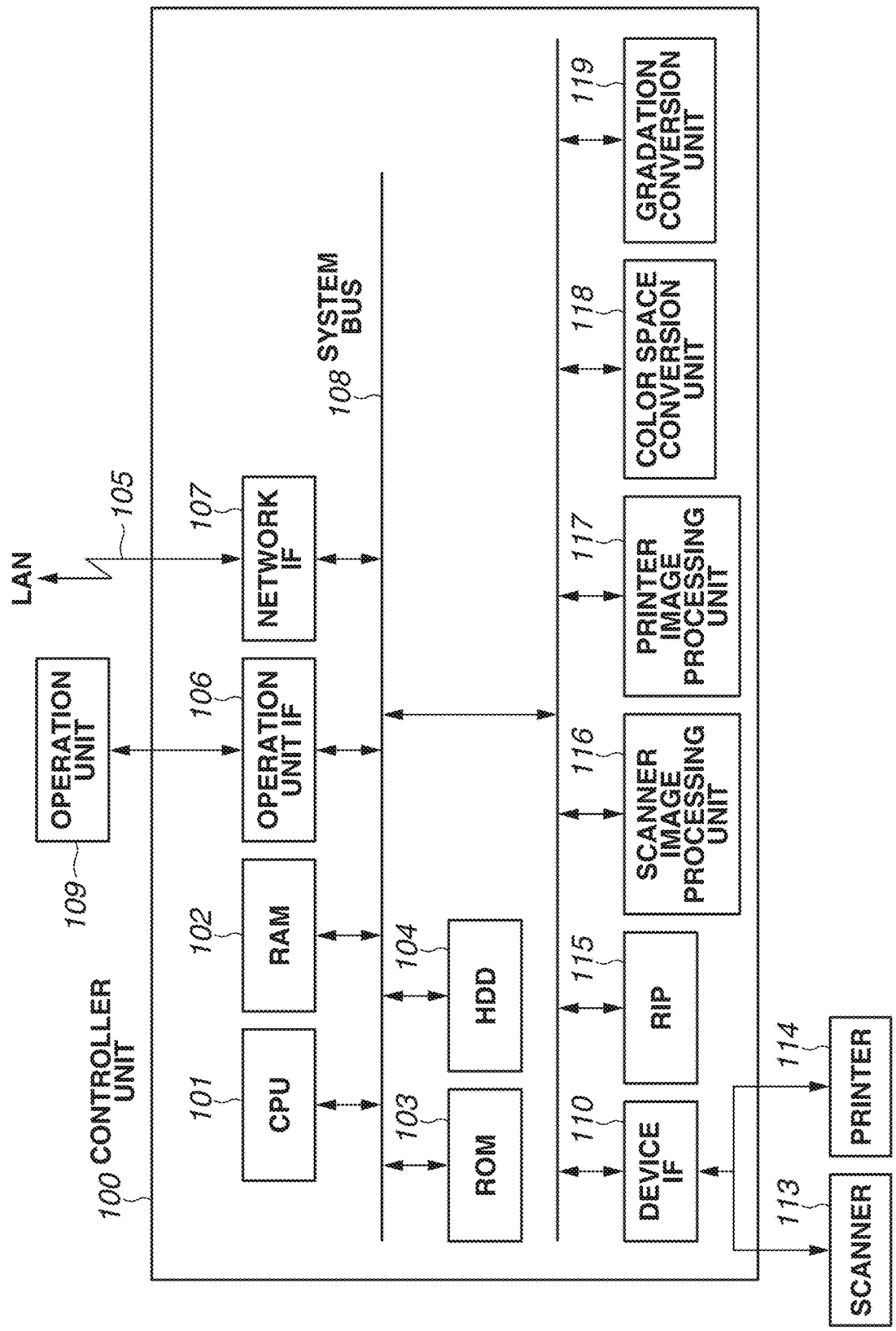
FIG. 1 is a block diagram illustrating an entire configuration of an image processing apparatus according to an exemplary embodiment.

FIG. 1 is a block diagram illustrating an entire configuration of an image processing apparatus according to an exemplary embodiment.

As illustrated in FIG. 1, an image processing apparatus 1 according to a first exemplary embodiment includes a controller unit 100, a scanner 113, a printer 114, and an operation unit 109.

The controller unit 100 controls the entire image processing apparatus 1. The scanner 113 is an image input device that reads image data from a document. The printer 114 is an image output device that performs printing on a recording sheet. The operation unit 109 is a user interface that receives an instruction from an operator and presents information to the operator. The scanner 113, the printer 114, and the operation unit 109 are each connected to the controller 100 and are each controlled by an instruction from the controller unit 100.

The controller unit 100 includes a central processing unit (CPU) 101. The CPU 101 is a controller that controls the entire system, and is connected to, via a system bus 108, a random access memory (RAM) 102, a read-only memory (ROM) 103, a hard disk drive (HDD) 104, an operation unit interface (I/F) 106, and a network I/F 107. The RAM 102 is a memory to provide a work area of the CPU 101. The RAM 102 is used as a setting value storage memory that temporarily stores parameter setting, and as an image memory that stores a part of the image data. The ROM 103 is a boot ROM that stores a system boot program, etc. The HDD 104 is a hard disk drive that stores system software, history of parameter setting values, image data, etc.

When the system boot program stored by the ROM 103 is read out and stored in the RAM 102, the CPU 101 enters a state where the CPU 101 can execute a controller program.

The operation unit I/F 106 is an interface for input/output between the controller unit 100 and the operation unit 109. The operation unit I/F 106 outputs, to the operation unit 109, image data instructed by the CPU 101 and displayed, and transmits, to the CPU 101, information input by the operator via the operation unit 109.

The network I/F 107 is connected to a local area network (LAN) 105, and performs input/output of information on the LAN 105.

A device I/F 110 connects the scanner 113 and the printer 114 that are an image input/output device, to the controller unit 100. The device I/F 110 performs synchronous/asynchronous conversion of image data and transmits setting values, adjustment values, and data about a device state.

A raster image processor (RIP) 115 rasterizes a page description language (PDL) code received from the LAN 105, into a bitmap image.

A scanner image processing unit 116 performs, on the image data input via the scanner 113, various kinds of processing, such as correction, modification, image area separation, scaling, and editing such as binarization. The scanner image processing unit 116 includes a function of determining, based on a chroma signal of the input image, whether the input image is a color document or a monochrome document, and storing a result of the determination.

A printer image processing unit 117 performs, on image data to be printed out, processing such as correction corresponding to the printer 114 and resolution conversion, and processing such as adjustment of a printing position of an image.

A color space conversion unit 118 converts, for example, a YUV image stored in the memory (e.g. RAM102 or HDD 104) into a Lab image through matrix calculation, and stores the Lab image in the memory (e.g. RAM102 or HDD 104).

A gradation conversion unit 119 converts an image of 8 bits/256 gradations stored in the memory (e.g. RAM102 or HDD 104) into an image of 1 bit/2 gradations by a method such as error diffusion processing, and stores the converted image in the memory (e.g. RAM102 or HDD 104). The color space conversion unit 118, the gradation conversion unit 119, an unillustrated image rotation unit, an unillustrated resolution conversion unit, and an unillustrated image compression unit are operable in conjunction with one another. For example, in a case where image rotation and resolution conversion are performed on the image stored in the memory (e.g. RAM102 or HDD 104), both the processes are performable without using the memory (e.g. RAM102 or HDD 104).

The printer 114 includes at least one or more feeding cassettes in which print sheets are stored. Information such as a residual sheet amount of each of the feeding cassettes and presence/absence of toner is transmitted to the CPU 101 through the device I/F 110.

The scanner 113 includes an auto document feeder and a platen reader, and can read both surfaces of a plurality of documents. The scanner 113 also includes a sensor that detects opening/closing of a document cover, presence/absence of a document, and a document size. The information detected by the sensor and state information of the scanner 113 are transmitted to the CPU 101 through the device I/F 110.

<Description of Software Module>

Figure 2:
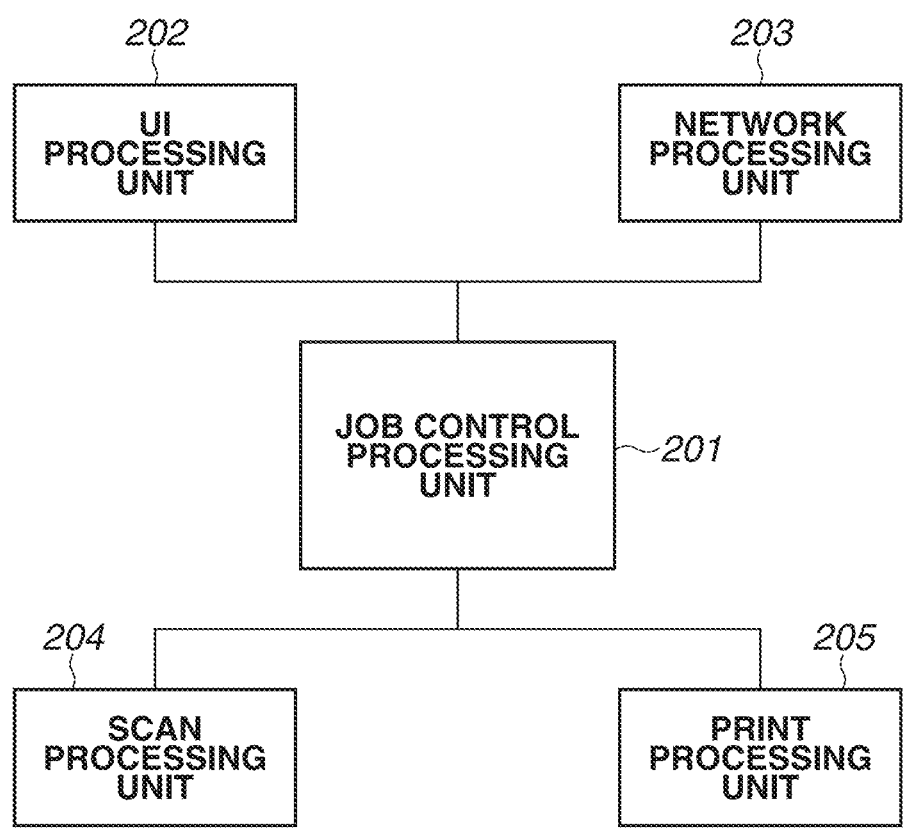
FIG. 2 is a diagram illustrating a software module configuration of the image processing apparatus according to the present exemplary embodiment.

FIG. 2 is a diagram illustrating a software module configuration of the image processing apparatus 1 according to the present exemplary embodiment. Each of illustrated software modules is operated when the CPU 101 executes programs held by the HDD 104, etc.

A job control processing unit 201 controls software modules, and controls all jobs occurred inside the image processing apparatus 1, such as copying, printing, scanning, and user interface (UI) processing.

A UI processing unit 202 performs control relating to the operation unit 109 and the operation unit I/F 106. The UI processing unit 202 notifies the job control processing unit 201 of operation contents of the operation unit 109 by the operator, and controls display contents on a display screen of the operation unit 109 in response to an instruction from the job control processing unit 201. The UI processing unit 202 controls, for example, editing of drawing data to be displayed on the operation unit 109.

A network processing unit 203 is a module that controls external communications that are performed via the network I/F 107, and controls communication with devices on the LAN 105. When receiving control commands and data from the devices on the LAN 105, the network processing unit 203 notifies the job control processing unit 201 of the received contents. The network processing unit 203 transmits control commands and data to the devices on the LAN 105 in response to an instruction from the job control processing unit 201.

A scan processing unit 204 controls the scanner 113 in response to an instruction of the job control processing unit 201, and instructs the scanner 113 to read a document placed on the auto document feeder or the platen reader of the scanner 113. The scan processing unit 204 instructs the scanner image processing unit 116 to perform image processing on the read document image. The scan processing unit 204 acquires the state information of the scanner 113 and notifies the job control processing unit 201 of the state information.

A print processing unit 205 controls the printer image processing unit 117 and the printer 114, and performs print processing on a specified image, in response to an instruction from the job control processing unit 201. The print processing unit 205 receives, from the job control processing unit 201, information such as image data, image information (e.g., size, color mode, and resolution of image data), layout information (e.g., offset, enlargement/reduction, and layout), and output sheet information (size and printing direction). The print processing unit 205 controls the printer image processing unit 117 to perform appropriate image processing on the image data, and controls and instruct the printer 114 to perform printing on the print sheet. The print processing 205 acquires state information of the printer 114 and notifies the job control processing unit 201 of the state information.

<Detailed Description of Scanner Image Processing Unit>

Figure 3:
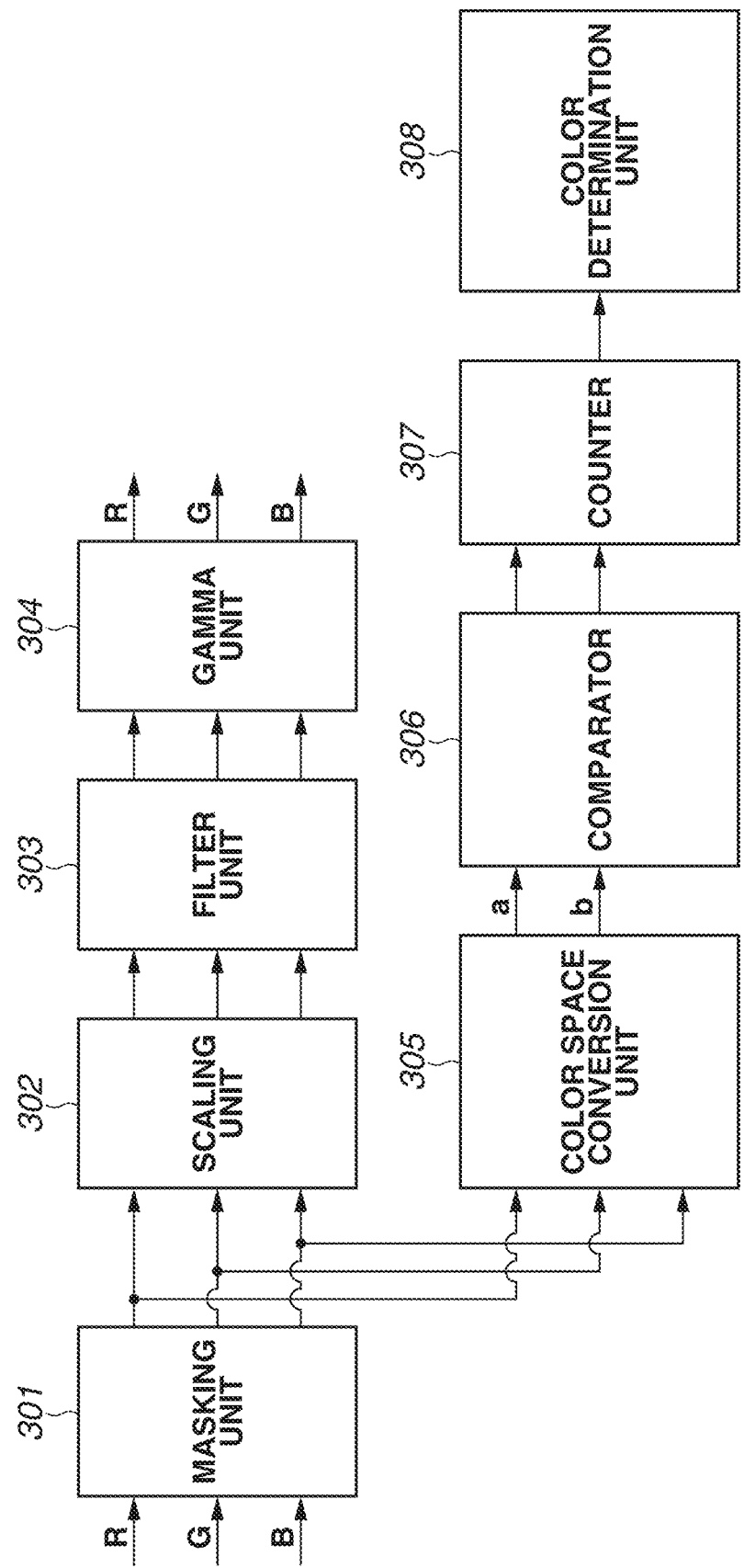
FIG. 3 is a diagram to explain details of a scanner image processing unit of an image processing apparatus according to a first exemplary embodiment.

FIG. 3 is a diagram to explain details of the scanner image processing unit 116 according to the first exemplary embodiment.

As illustrated in FIG. 3, luminance signals of 8 bits for colors RGB provided from the scanner 113 are converted by a masking unit 301 into standard RGB color signals that are independent of filter colors of charge-coupled devices (CCDs).

A scaling unit 302 receives the RGB signals output from the masking unit 301, and performs scaling of the RGB signals as necessary. A filter 303 receives the RGB signals output from the scaling unit 302, and performs filter processing such as shading and modulation of the image. A gamma unit 304 receives the RGB signals output from the filter 303, and performs gamma correction so as to make the density of the entire image thicker or thinner.

A color space conversion unit 305 receives the RGB signals output from the masking unit 301, and converts the image signals before scaling into known Lab image signals for determination whether the document is a color document or a monochrome document. Among them, a and b indicate color signal components. A comparator 306 receives the color signal components a and b output from the color space conversion unit 305. When a level of each of the color signal components is equal to or higher than a predetermined level, the comparator 306 outputs a 1-bit determination signal indicating color, and otherwise, the comparator 306 outputs a 1-bit determination signal indicating monochrome. A counter 307 measures the 1-bit determination signal output from the comparator 306.

A color determination unit 308 compares a measurement result (counter value) of the counter 307 and a reference value of color determination (hereinafter, "color determination value") of auto color selection (ACS), to determine whether a document is a color document or a monochrome document. In a case where the number of color pixels included in the image data exceeds the color determination value, the color determination unit 308 determines the document as a color document, and in a case where the number of color pixels does not exceed the color determination value, the color determination unit 308 determines the document as a monochrome document. While details are described below, in the first exemplary embodiment, a value set as the color determination value of the color determination unit 308 is changed over based on the setting of a color mode described below.

<Configuration of Operation Unit 109>

A configuration of the operation unit 109 is described below with reference to FIG. 4 to FIG. 6.

Figure 4:
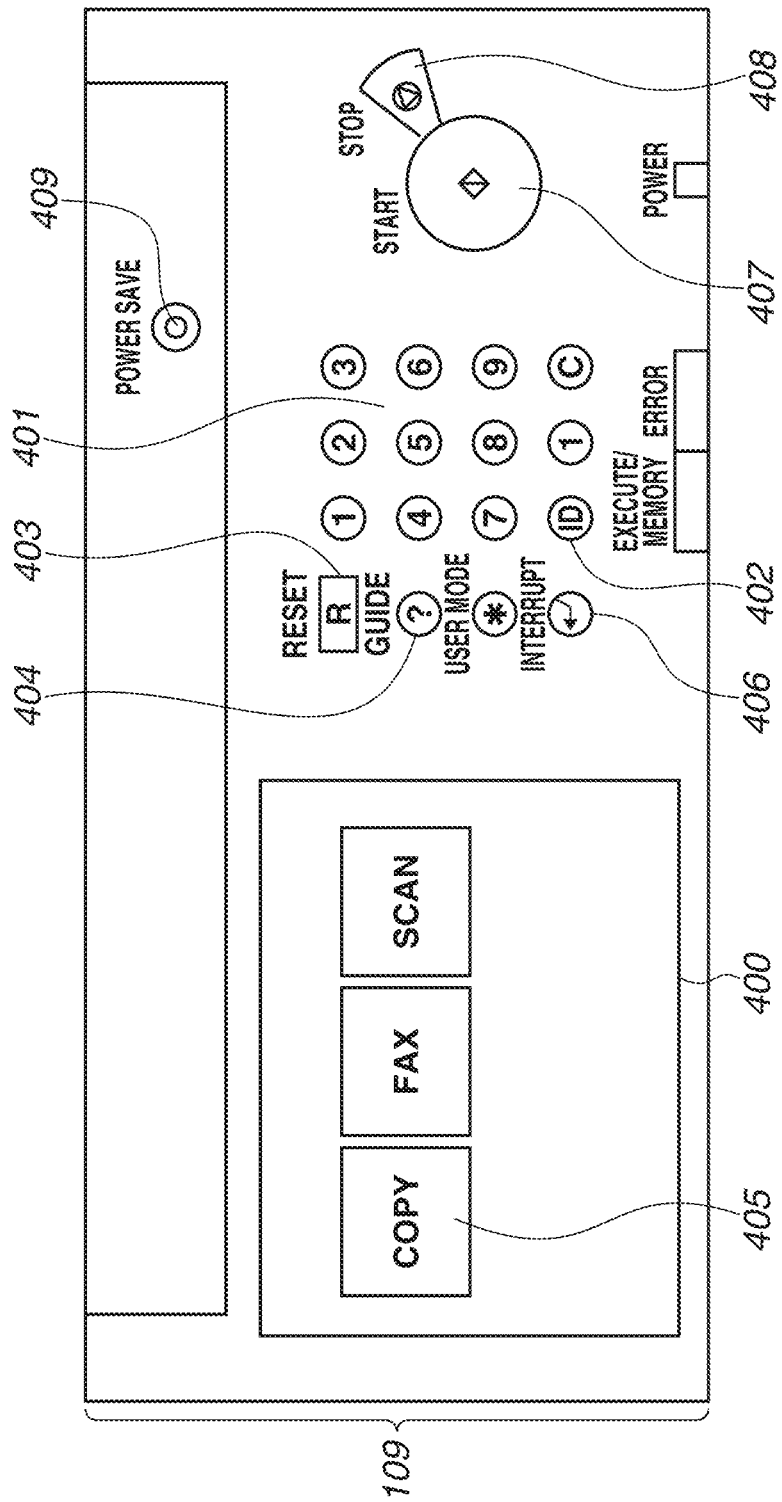
FIG. 4 is a diagram to explain an appearance of an operation unit of the image processing apparatus according to the present exemplary embodiment.

FIG. 4 is a diagram to explain an appearance of the operation unit 109.

In FIG. 4, a liquid crystal display (LCD) touch panel 400 is a display input unit of the operation unit 109, and main mode setting and state display are performed on the LCD touch panel 400. A numeric keypad 401 is used to input numeric values from 0 to 9. An identification (ID) button 402 is used to input a department number and a password mode in a case where the image processing apparatus 1 is managed for each department.

A reset button 403 is used to reset the set mode. A guide button 404 is used to display an explanation screen for each mode. An interruption button 406 is used to perform interruption copy.

A copy start button 407 is used to start copy operation. A stop button 408 is used to suspend a copy job under execution. A power saving switch (SW) 409 is used to turn off a backlight of the LCD touch panel 400 and to put the apparatus into a power saving state by being depressed.

A copy icon 405 is displayed on the LCD touch pan 1400. When the copy icon 405 is depressed, a copy screen 500 in FIG. 5 is displayed on the LCD touch panel 400.

Figure 5:
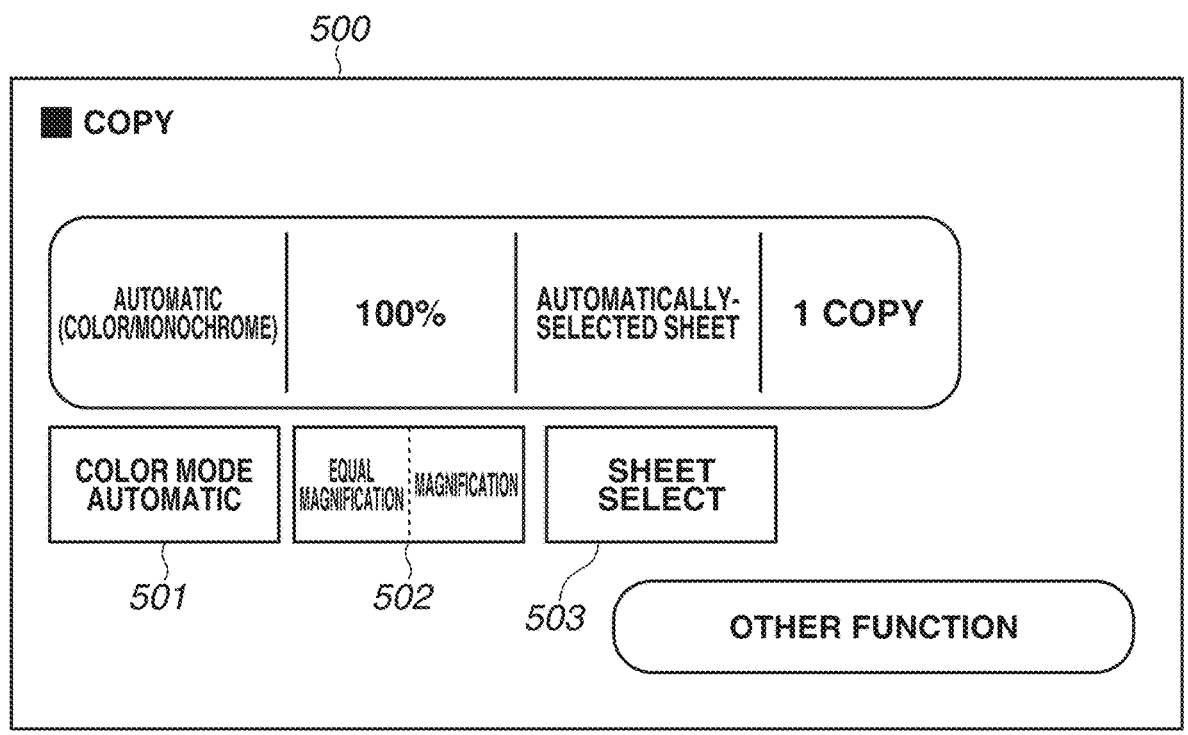
FIG. 5 is a diagram illustrating a copy screen of the image processing apparatus according to the present exemplary embodiment.

FIG. 5 is a diagram to explain an example of the copy screen 500 displayed on the LCD touch panel 400 of the operation unit 109.

In the copy screen 500 in FIG. 5, a magnification setting key 502 is used to set printing magnification. A sheet selection key 503 is used to set whether a feeding cassette desired to be used for printing is directly specified by a user or a feeding cassette is automatically determined according to a print image. A color mode setting key 501 is used to set a color mode of a document. When the color mode setting key 501 is depressed, a pop-up screen of color mode setting in FIG. 6 is displayed on the LCD touch panel 400.

Figure 6:
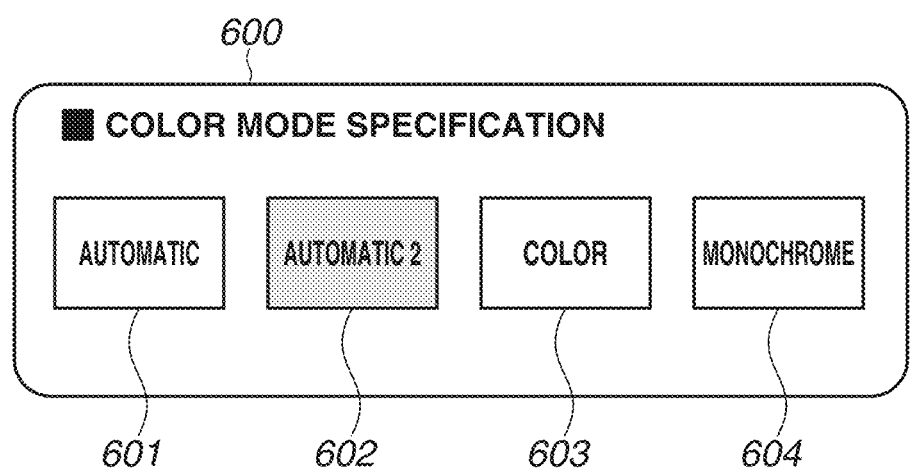
FIG. 6 is a diagram illustrating a color mode setting screen of the image processing apparatus according to the present exemplary embodiment.

FIG. 6 is a diagram to explain an example of a pop-up screen 600 for color mode setting displayed on the LCD touch panel 400 of the operation unit 109.

In the pop-up screen 600 for color ode setting in FIG. 6, keys 601 to 604 are used to set respective color modes.

The key 601 is used to set the color mode to "automatic". In a case where the color mode is "automatic", the document is determined as a color document even when the document includes a minute color element.

The key 602 is used to set the color mode to "automatic 2". In a case where the color mode is "automatic 2", the document is determined as a monochrome document if the document includes only a minute color element.

The key 603 is used to set the color mode to "color". In a case where the color mode is "color", the ACS is not performed, and the document is fixedly processed as a color document. The key 604 is used to set the color mode to "monochrome". In a case where the color mode is "monochrome", the ACS is not performed, and the document is fixedly processed as a monochrome document.

The color mode is set for each job including reading of the document.

<Flowchart>

Figure 7:
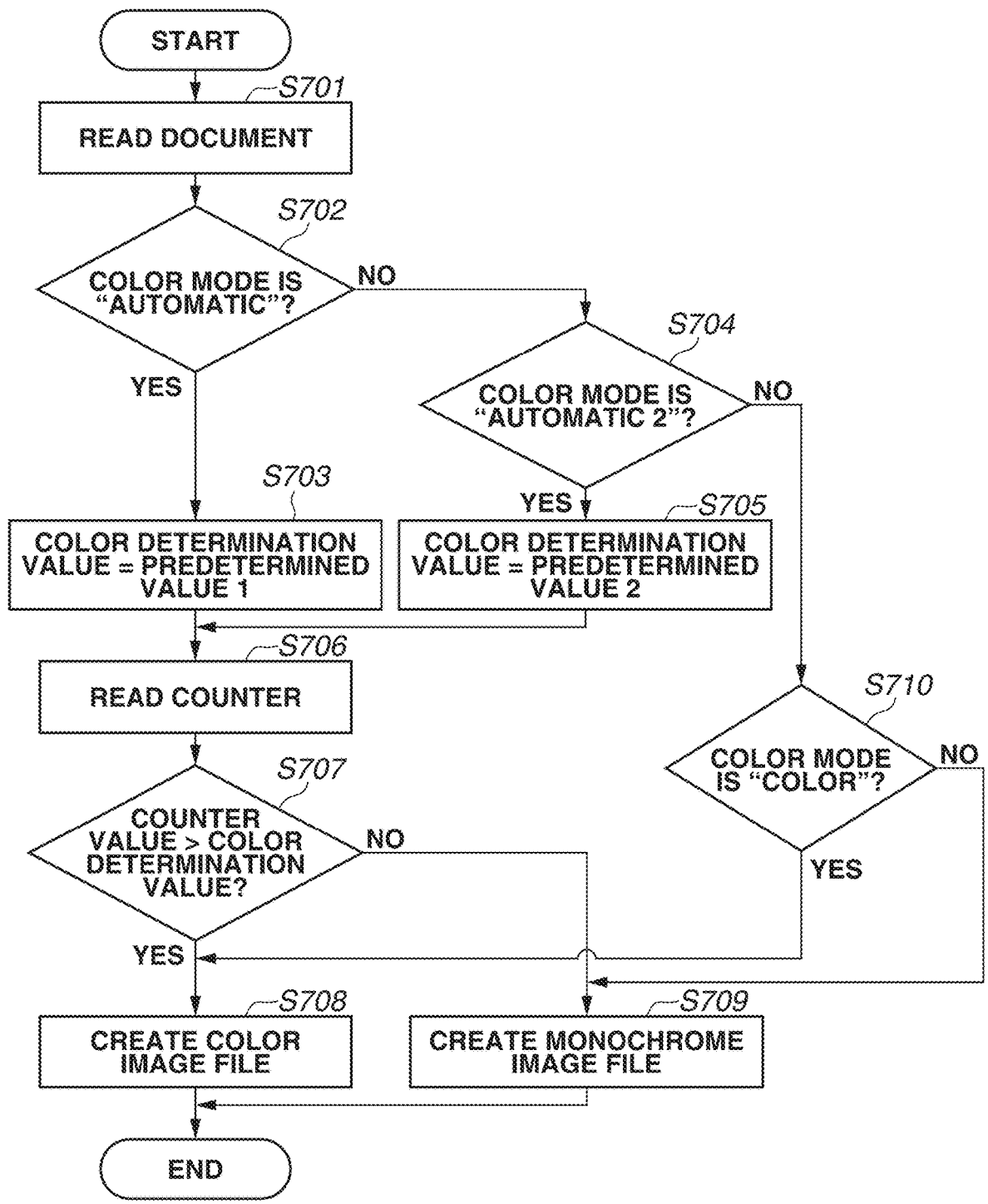
FIG. 7 is a flowchart illustrating processing when scan images are accumulated, according to the first exemplary embodiment.

A method of determining a color of a document image according to the first exemplary embodiment will be described below with reference to FIG. 7. FIG. 7 is a flowchart illustrating an example of processing when scan images are accumulated, according to the first exemplary embodiment. The processing by the CPU 101 in FIG. 7 is realized when the CPU 101 reads and executes the programs held by the HDD 104, etc.

In step S701, the scanner 113 reads the document image as RGB color image data to the memory under control of the CPU 101, and the CPU 101 transfers the RGB color image data to the RAM 102 through the device I/F 110.

In step S702, the CPU 101 determines whether the color mode set by the keys 601 to 604 is "automatic". In a case where the CPU 101 determines that the color mode is "automatic" (YES in step S702), the processing proceeds to step S703.

In step S703, the CPU 101 instructs the scanner image processing unit 116 to set a predetermined value 1 as the color determination value of the color determination unit 308, and the processing then proceeds to step S706. In response to the instruction, the scanner image processing unit 116 sets the color determination value of the color determination unit 308 to the predetermined value 1.

In a case where the CPU 101 determines in step S702 that the color mode is not "automatic" (NO in step S702), the processing proceeds to step S704.

In step S704, the CPU 101 determines whether the color mode is "automatic 2". In a case where the CPU 101 determines that the color mode is "automatic 2" (YES in step S704), the processing proceeds to step S705.

In step S705, the CPU 101 instructs the scanner image processing unit 116 to set a predetermined value 2 as the color determination value of the color determination unit 308. In response to the instruction, the scanner image processing unit 116 sets the color determination value of the color determination unit 308 to the predetermined value 2. When the predetermined value 2 is made greater than the predetermined value 1, the document is less likely to be determined as a color document in the color mode "automatic 2", as compared with the color mode "automatic".

In the case where the color mode is "automatic" or "automatic 2", the scanner image processing unit 116 sets the color determination value to a value corresponding to the color mode, and then reads the value of the counter 307 in step S706.

In the scanner image processing unit 116, the color determination unit 308 compares the counter value read in step S706 and the above-described color determination value, to perform color determination. In a case where the counter value read in step S706 is greater than the above-described color determination value (YES in step S707), the color determination unit 308 of the scanner image processing unit 116 determines that the document is a color document. The CPU 101 acquires a result of the color determination (in this case, "color document") from the scanner image processing unit 116. The processing then proceeds to step S708. In step S708, the CPU 101 accumulates, as a color image file, the RGB color image acquired from the scanner 113 in the HDD 104. The processing in this flowchart then ends.

In a case where the counter value read in step S706 is less than or equal to the color determination value (NO in step S707), the color determination unit 308 of the scanner image processing unit 116 determines that the document is a monochrome document. The CPU 101 acquires a result of the color determination (in this case, "monochrome document") from the scanner image processing unit 116. The processing then proceeds to step S709. In step S709, the CPU 101 converts the RGB color image data acquired from the scanner 113, into monochrome image data by the color space conversion unit 118, and accumulates the converted image data as a monochrome image file in the HDD 104. The processing in the flowchart then ends.

In a case where the CPU 101 determines in step S704 that the color mode is not "automatic 2" (NO in step S704), it is unnecessary to perform the ACS, and the processing proceeds to step S710.

In step S710, the CPU 101 determines whether the color mode is "color". In a case where the CPU determines that the color mode is "color" (YES in step S710), the processing proceeds to step S708. In step S708, the CPU 101 accumulates, as a color image file, the RGB color image data acquired from the scanner 113, in the HDD 104. The processing in the flowchart then ends.

In a case where the CPU 101 determines in step S710 that the color mode is not "color" (NO in step S710), the processing proceeds to step S709. In step S709, the CPU 101 converts the RGB color image data acquired from the scanner 113 into monochrome image data by the color space conversion unit 118, and accumulates the converted image data as a monochrome image file in the HDD 104. The processing in the flowchart then ends.

As described above, according to the first exemplary embodiment, it is possible to suppress, in the ACS function, color determination resulting from a minute color element of a document without troubling the user.

In the above-described first exemplary embodiment, the configuration in which a plurality of color determination reference values is provided with respect to one color determination unit 308 included in the scanner image processing unit 116, to provide a plurality of modes of the ACS has been described. In a second exemplary embodiment, a configuration in which a plurality of color determination units is provided in the scanner image processing unit 116 will be described with reference to FIG. 8 and FIG. 9.

Figure 8:
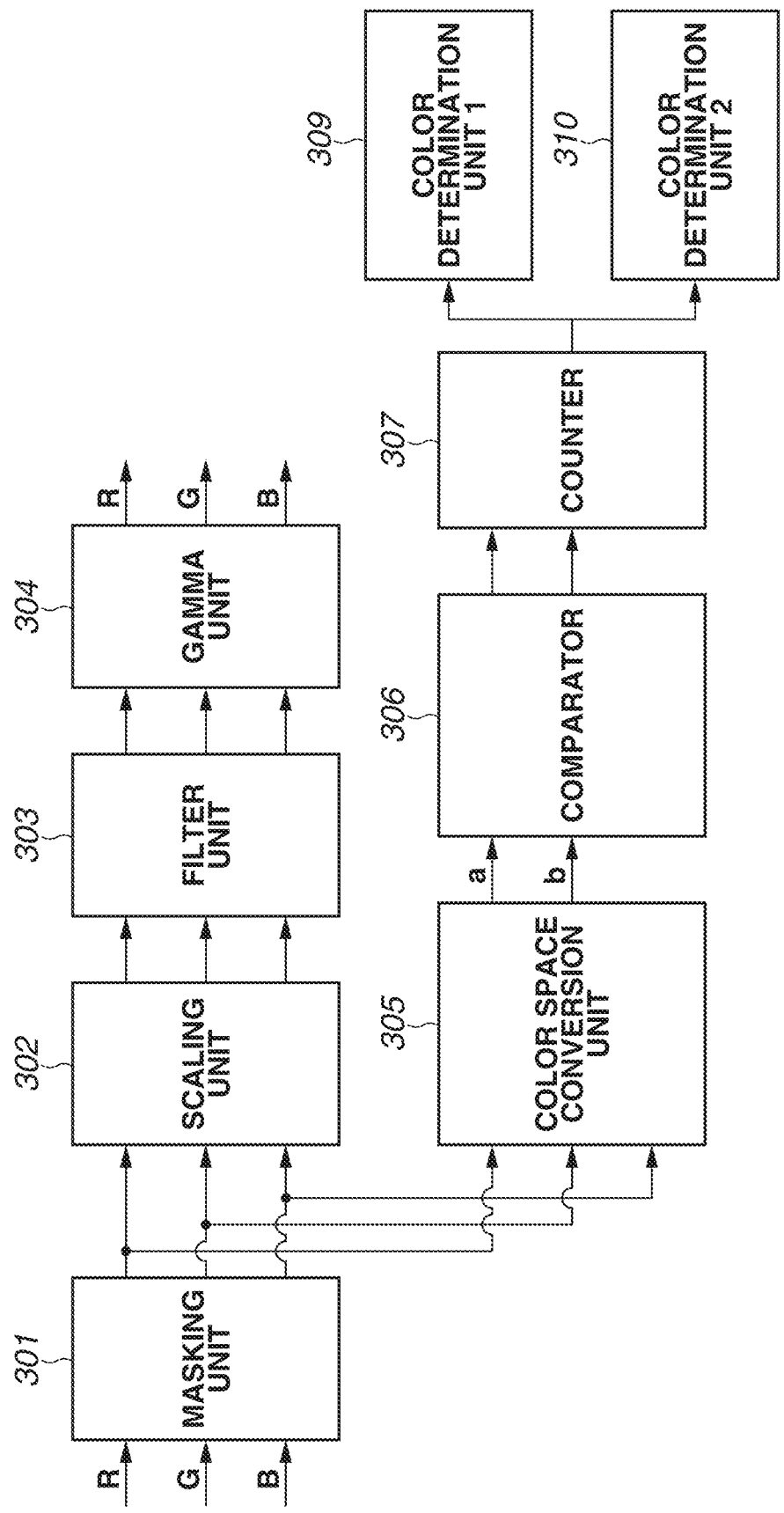
FIG. 8 is a diagram illustrating details of a scanner image processing unit of an image processing apparatus according to a second exemplary embodiment.

FIG. 8 is a diagram to explain details of the scanner image processing unit 116 according to the second exemplary embodiment.

As illustrated in FIG. 8, the scanner image processing unit 116 according to the second exemplary embodiment includes a plurality of color determination units (color determination unit 1 (309) and color determination unit 2 (310)).

The color determination unit 1 (309) compares the measurement result (counter value) of the counter 307 and the color determination value (predetermined value 1), to determine whether the document is a color document or a monochrome document.

The color determination unit 2 (310) compares the measurement result (counter value) of the counter 307 and the color determination value (predetermined value 2), to determine whether the document is a color document or a monochrome document.

The color determination value 2 (=predetermined value 2) used by the color determination unit 2 (310) is set greater than the color determination value 1 (=predetermined value 1) used by the color determination unit 1 (310). In other words, in a case where the color determination is performed with use of the color determination unit 2 (310), the document is less likely to be determined as a color document, as compared with a case where the color determination is performed with use of the color determination unit 1 (310).

Figure 9:
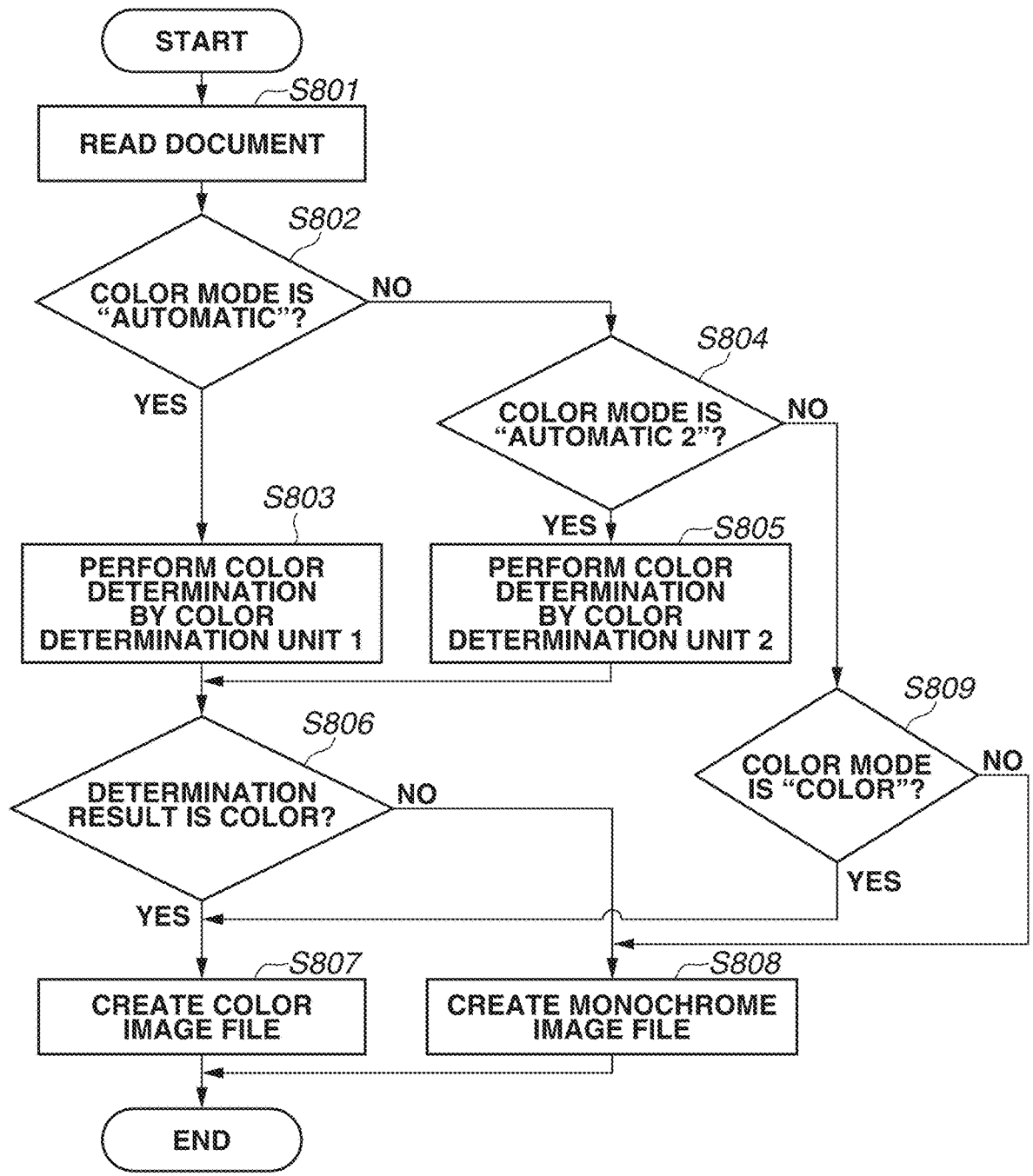
FIG. 9 is a flowchart illustrating processing when scan images are accumulated, according to the second exemplary embodiment.

FIG. 9 is a flowchart illustrating an example of processing when the scan images are accumulated, according to the second exemplary embodiment. The processing of the CPU 101 in FIG. 9 is realized when the CPU 101 reads and executes the programs held by the HDD 104, etc.

The processes in steps S801, S802, and S804 are respectively the same as processes in steps S701, S702, and S704 in FIG. 7, and description of the steps is therefore omitted. In step S802, in a case where the color mode is determined as "automatic" (YES in step S802), the processing proceeds to step S803.

In step S803, the CPU 101 instructs the scanner image processing unit 116 to perform the color determination with use of the color determination unit 1 (309). The processing then proceeds to step S806. In response to the instruction, the scanner image processing unit 116 performs the color determination with use of the color determination unit 1 (309).

In a case where it is determined in step S804 that the color mode is "automatic 2" (YES in step S804), the processing proceeds to step S805.

In step S805, the CPU 101 instructs the scanner image processing unit 116 to perform the color determination with use of the color determination unit 2 (310). The processing then proceeds to step S806. In response to the instruction, the scanner image processing unit 116 performs the color determination with use of the color determination unit 2 (310).

In step S806, the CPU 101 acquires a result of the color determination performed. In step S803 or S805 by the scanner image processing unit 116, and determines whether the result of the color determination is "color document". In a case where the CPU 101 determines that the result of the color determination performed by the scanner image processing unit 116 is "color document" (YES in step S806), the processing proceeds to step S807. In step S807, the CPU 101 accumulates, as a color image file, the RCB color image data acquired from the scanner 113, in the HDD 104. The processing in the flowchart then ends.

In a case where the CPU 101 determines in step S806 that the result of the color determination performed by the seamier image processing unit 116 is not a "color document", i.e., is a monochrome document (NO in step S806), the processing proceeds to step S808. In step S808, the CPU 101 converts the RGB color image data acquired from the scanner 113 into monochrome image data by the color space conversion unit 118, and accumulates the converted image data as a monochrome image file, in the HDD 104. The processing in the flowchart then ends.

Processes in steps S809, S807, and S808 are respectively the same as the processes in steps S710, S708, and S709 in FIG. 7, and description of the steps is therefore omitted.

The color determination unit 1 and the color determination unit 2 described above may each include any configuration as long as the color determination unit 2 includes the configuration in which the document is less likely to be determined as a color document, as compared with the configuration of the color determination unit 1.

As described above, according to the second exemplary embodiment, it is possible to suppress, in the ACS function, color determination resulting from a minute color element of a document without troubling the user, as with the first exemplary embodiment.

The configuration and the contents of the various kinds of data are not limited to those described above, and the various kinds of data can include other various configurations and contents according to an application or a purpose.

While some exemplary embodiments have been described, the present disclosure can adopt an implementation form of, for example, a system, an apparatus, a method, a program, or a storage medium. Specifically, the present disclosure can be applied to a system including a plurality of devices, or to an apparatus including one device.

Combined configurations of the above-described exemplary embodiments are also all included in the present disclosure.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™) a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-159942, filed Aug. 23, 2017, which is hereby incorporated by reference herein in its entirety.

What is claimed is:

1. An image processing apparatus, comprising:
    a reading unit configured to read a document and generate image data;
    a determination unit configured to determine whether the document is a color document or a monochrome document based on the image data and a reference value of a number of color pixels;
    a processing unit configured to process the image data based on a result of the color determination;
    a displaying unit configured to display a screen including a first object for setting a first reference value as the reference value and a second object for setting a second reference as the reference value; and
    a user interface, wherein
    the determination unit determines that the document is the color document at least based on the number of color pixels included in the image data exceeding the first reference value in a case where the first object is selected by the user interface,
    the determination determines that the document is the monochrome document at least based on the number of color pixels included in the image not exceeding the first reference value in a case where the first object is selected by the user interface,
    the determination unit determines that the document is the color document at least based on the number of color pixels included in the image data exceeding the second reference value in a case where the second object is selected by the user interface,
    the determination determines that the document is the monochrome document at least based on the number of color pixels included in the image data not exceeding the second reference value in a case where the second object is selected by the user interface, and
    wherein the second value is greater than the first reference value.

2. The image processing apparatus according to claim 1, wherein the reference value is settable for each job including reading of the document.

3. The image processing apparatus according to claim 1, wherein the processing unit stores the image data as a color file in a case where the determination unit determines that the document is the color document, and stores the image data as a monochrome file in a case where the determination unit determines that the document is the monochrome document.

4. The image processing apparatus according to claim 1, wherein the screen further includes a third object for causing the image processing apparatus to determine that the document is the color document regardless of the reference value.

5. A method of controlling an image processing apparatus, comprising:
    reading a document and generating image data,
    determining whether the document is a color document or a monochrome document based on the image data and a reference value of a number of color pixels, and
    processing the image data based on a result of the color determination; and
    displaying a screen including a first object for setting a first reference value as the reference value and a second object for setting a second reference value as the reference value
    wherein it is determined that the document is the color document at least based on the number of color pixels included in the image data exceeding a first reference value in a case where the first object is selected by a user, it is determined that the document is the monochrome document at least based on the number of color pixels included in the image data not exceeding the first reference value in a case where the first object is selected by the user, it is determined that the document is the color document at least based on the number of color pixels included in the image data exceeding a second reference value in a case where the second object is selected by the user, it is determined that the document is the monochrome document at least based on the number of color pixels included in the image data not exceeding the second reference value in a case where the second object is selected by the user, and the second reference value is greater than the first reference value.

6. The method according to claim 5, wherein the screen further includes a third object for causing the image processing apparatus to determine that the document is the color document regardless of the reference value.

7. A non-transitory computer-readable storage medium storing a program that causes a computer to execute a method of controlling an image processing apparatus, the method comprising:

reading a document and generating image data, determining whether the document is a color document or a monochrome document based on the image data and a reference value of a number of color pixels;

processing the image data based on a result of the color determination; and displaying a screen including a first object for setting a first reference value as the reference value and a second object for setting a second reference value as the reference value, wherein it is determined that the document is the color document at least based on the number of color pixels included in the image data exceeding a first reference value in a case where the first object is selected by a user, it is determined that the document is the monochrome document at least based on the number of color pixels included in the image data not exceeding the first reference value in a case where the first object is selected by the user, it is determined that the document is the color document at least based on the number of color pixels included in the image data exceeding a second reference value in a case where the second object is selected by the user, it is determined that the document is the monochrome document at least based on the number of color pixels included in the image data not exceeding the second reference value in a case where the second object is selected by the user, and the second reference value is greater than the first reference value.

8. The non-transitory computer-readable storage medium according to claim 7, wherein the screen further includes a third object for causing the image processing apparatus to determine that the document is the color document regardless of the reference value.

\* \* \* \* \*